United States Patent [19]

Carey

[11] Patent Number: 4,741,661
[45] Date of Patent: May 3, 1988

[54] WHEEL LIFTING AND TOWING APPARATUS

[75] Inventor: Steven J. Carey, Signal Mountain, Tenn.

[73] Assignee: Sherman & Reilly Inc., Chattanooga, Tenn.

[21] Appl. No.: 909,572

[22] Filed: Sep. 22, 1986

[51] Int. Cl.$^4$ ............................................. B60P 3/12
[52] U.S. Cl. ................... 414/563; 414/598; 414/648; 280/402; 187/8.47; 187/8.5
[58] Field of Search ............... 414/563, 598, 639, 648, 414/649, 650; 280/402; 187/8.65, 8.51, 8.50, 8.49, 8.52, 8.47, 9 R

[56] References Cited

U.S. PATENT DOCUMENTS

| | | | |
|---|---|---|---|
| 1,426,116 | 8/1922 | Simons | 414/648 |
| 2,735,558 | 2/1956 | Chesher | 414/598 |
| 3,282,449 | 11/1966 | Buford | 414/540 |
| 3,435,915 | 4/1969 | Villars | 187/8.47 |
| 3,599,811 | 8/1971 | Watkins | 214/86 A |
| 3,667,630 | 6/1972 | Scott | 214/86 A |
| 4,000,823 | 1/1977 | Aquila | 213/86 A |
| 4,331,219 | 5/1982 | Suzuki | 187/8.5 |
| 4,384,817 | 5/1983 | Peterson | 414/563 |
| 4,451,193 | 5/1984 | Cannon et al. | 414/563 |
| 4,473,237 | 9/1984 | Lind | 280/402 |
| 4,473,334 | 9/1984 | Brown | 414/563 |
| 4,534,579 | 8/1985 | Shackelford | 280/402 |
| 4,557,496 | 12/1985 | Sill | 280/402 |
| 4,564,207 | 1/1986 | Russ et al. | 414/563 X |
| 4,573,857 | 3/1986 | Porter, Sr. et al. | 414/563 |
| 4,632,629 | 12/1986 | Kooima | 414/563 |
| 4,637,623 | 1/1987 | Bubik | 414/563 X |
| 4,640,660 | 2/1987 | Watson | 414/563 |

FOREIGN PATENT DOCUMENTS

| | | | |
|---|---|---|---|
| 502177 | 4/1951 | Belgium | 414/545 |
| 99830 | 4/1962 | Norway | 414/648 |
| 438044 | 11/1967 | Switzerland | 414/563 |
| 2044721 | 10/1980 | United Kingdom | 414/540 |
| 2137163 | 10/1984 | United Kingdom | 414/545 |
| 789296 | 12/1980 | U.S.S.R. | 414/563 |

Primary Examiner—Frank E. Werner
Attorney, Agent, or Firm—McCaleb, Lucas & Brugman

[57] ABSTRACT

A vehicle mounted automobile "wheel lift" towing mechanism having a power actuated lift boom vertically movable between raised and lowered positions along angularly inclined parallel tracks having cam members operable to impart predetermined vertical tilting movements to the boom; the latter at ground engagement being tiltable to conform to variations in ground slope; power actuation of the boom being responsive to extension and contraction of a horizontal lift cylinder assembly having a linearly movable piston. Manually operable wheel engaging apparatus, is carried by the lift boom for positively coupling a pair of vehicle wheels to the towing mechanism and includes a pair of pivotally movable wheel restraints operable to swing arcuately about vertical axes from positions laterally outwardly of adjacently opposed vehicle wheels to positions behind such wheels for restraining the latter against opposing wheel chocks.

16 Claims, 11 Drawing Sheets

WHEEL LIFTING AND TOWING APPARATUS

This invention relates generally to automobile towing equipment and more particularly to an improved wheel lift mechanism for engaging the wheels of a disabled vehicle and elevating the vehicle for towing purposes.

BACKGROUND OF THE INVENTION

Recently so called "wheel lift" towing systems for coupling a disabled vehicle to a tow truck have gained increased popularity. This is particularly true with the advent of front wheel drive vehicles and the use of air spoilers, plastic panels and like structural developments in automobile design which are susceptible to damage when using more conventional chains, cables, straps, slings or similar "wrecker" apparatus which hook onto the vehicle's bumper, undercarriage frame, axles and the like.

While known "wheel lift" towing mechanisms are designed to engage the vehicle's wheels and elevate one end of the vehicle for transporting by a wrecker tow truck, such systems are not without their problems and shortcomings. Until recently, for example, known "wheel lift" systems were unable to compensate for uneven surfaces and ground levels or grades at the sight of the vehicle to be towed. If the ground slope were at a severe enough angle relative to the wrecker, it made it very difficult, if not impossible, to couple the wheel restraints to the disabled vehicle's wheels. In answer to this problem, some systems have incorporated a powered tilt cylinder assembly for tilting the outer lift boom of the "wheel lift" apparatus. This enables the wheel engaging restraints to be placed at various angles vertically in order to line up with and engage the disabled vehicle wheels. While this modification may be generally satisfactory from a functional standpoint, the additional weight and cost of the tilt cylinder assembly is not acceptable, particularly at the rear extremity of the tow truck where its weight has maximum unbalancing effect.

Of similar consequence has been the prevalence in past "wheel lift" mechanisms to employ pivotal lift masts and powered lift cylinder arrangements or winch hoists for elevating the towed vehicle once its wheels have been coupled to the towing mechanism. Examples of such prior devleopments are found in U.S. Pat. Nos. 3,599,811, issued Aug. 17, 1971; 3,667,630, issued June 7, 1960; 4,000,823, issued Jan. 4, 1977; 4,451,193, issued May 29, 1984; and 4,473,334, issued Sept. 25, 1984, among others. Aside from size, weight and cost factors, one of the major detractions of such mechanisms is the need for sufficient head room to permit elevation of the mast while maintaining sufficient clearance of overhead obstructions, such as bridges, underpasses and like obstacles to provide for passage of the towed vehicle.

SUMMARY OF THE INVENTION

The present invention is directed to improved "wheel lift" towing mechanisms and wheel engagement apparatus which overcome the above mentioned shortcomings of the prior art.

In general, this invention provides economical and operationally efficient means for modifying and equipping tow trucks for "wheel lift" towing operation. According to the more salient features of this invention, weight is minimized and evenly distributed with respect to the rear axle of the towing vehicle; the conventional pivotal elevating lift mast with its attendant overhead room requirements and limitations is eliminated from the "wheel lift" and towing functions, unique compact cam actuated means automatically control activation of a power operated lift boom to effect predetermined vertical and tilting movements of the lifting and wheel engagement apparatus in order to raise and lower a disabled vehicle and accomodate variations in ground levels, while simplified wheel engaging means afford efficient and positive operator-controlled wheel restraint to assure safe towing of a disabled vehicle. These features are accompanied by adjustable flexibility of the wheel engagement and lift apparatus to adapt the towing mechanism to a wide variety of vehicle sizes and wheel spacing requirements.

Briefly, this invention combines a horizontally disposed lift cylinder having a linearly moveable piston means for actuating articulated lift means stationarily anchored at one end and at its opposite end to a moveable lift boom means moveable within an angularly inclined track assembly depending rearwardly beneath the tail end of the truck body. This assembly carries plural cam track means engageable by follower rollers mounted on the lift boom. Extension of the lift cylinder and piston means raises the lift boom within the angularly disposed track assembly and contraction of the piston and cylinder means lowers the lift boom. Such movements of the lift boom cause the roller means thereon to cooperate with the cam track means to vertically tilt the lift boom; the latter of which includes an extensible inner boom carrying a pivotal cross tree at its outer end. Adjustable wheel engaging means mounted at opposite ends of the cross tree include pivotally movable wheel restraint means operable to swing arcuately inwardly to positions behind a disabled vehicle's front or rear wheels to engagably confine such wheels against cooperating wheel chocks.

It is a principal object of this invention to provide an improved "wheel lift" towing mechanism.

It is another important object of this invention to provide an improved "wheel lift" towing mechanism embodying cam actuated lift boom means capable of vertical tilting, raising and lowering movements.

Still another important object of this invention is to provide improved wheel engagement means for use in "wheel lift" towing mechanisms.

Another important object of this invention is to provide improved wheel engagement means, as set forth in the preceding object, in which a pair of vehicle wheels are locked to a lift boom by means which move arcuately behind the wheels from positions laterally outwardly thereof.

A further object of this invention is to provide an improved wheel lift mechanism which is compact, operationally dependable and economical to manufacture and maintain.

The above and further objects, features and advantages of this invention will be apparent to those of normal skill in the art from the following description of a preferred embodiment thereof, illustrated in the accompanying drawings and representing the best mode presently contemplated for practicing this invention.

IN THE DRAWINGS

FIG. 11 is a schematic representation of the cooperating cam means and follower rollers embodied in the track assembly and lift boom shown in FIGS. 8-10;

FIGS. 12 A-D are a series of schematic views illustrating the tilting movements imparted to the lift boom in accordance with movements of the follower rollers along the cam means shown in FIG. 11;

FIGS. 25 A-H are a series of partial perspective views illustrative of sequential operating positions of the wheel lift mechanism when moving from a stored position on the tow truck to a postion for engaging the wheels of a disabled vehicle.

DESCRIPTION OF THE PREFERRED EMBODIMENT

Figure 1:
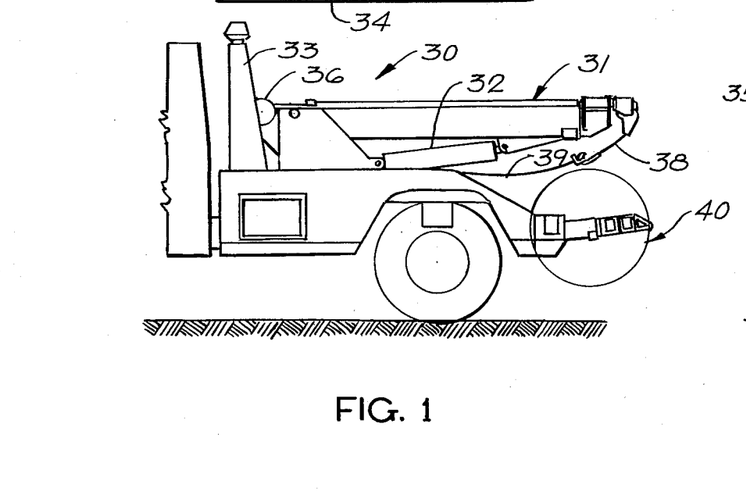
FIG. 1 is a partial view in side elevation of a typical wrecker or tow truck embodying the wheel lift mechanism of this invention.
Figure 2:
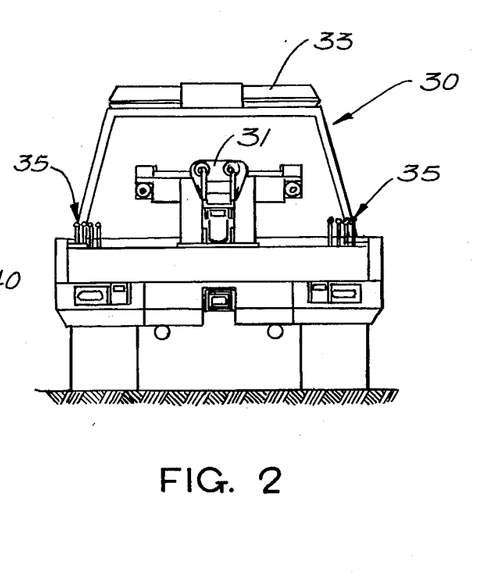
FIG. 2 is a rear elevation of the tow truck shown in FIG. 1.
Figure 3:
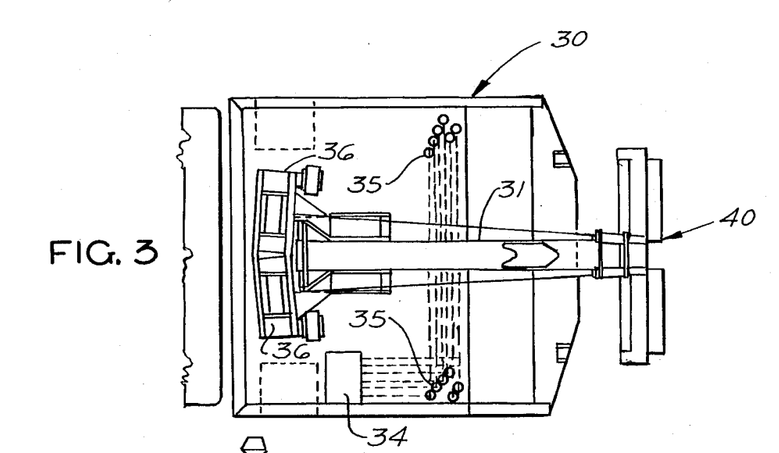
FIG. 3 is a top plan view thereof.

Turning now to the particulars of the preferred embodiment shown in the accompanying drawings, initial reference is made to FIGS. 1-3 illustrative of the general environment in which the present invention is useful. More specifically, it will be recognized that these three figures illustrate a rear portion of a typical tow truck or "wrecker", indicated generally by numeral 30, equipped with the usual wrecker boom 31 actuated by an hydraulic lift cylinder 32. Boom 31 extends generally centrally and rearwardly of the wrecker in overhanging relationship to the rear or tailgate end thereof. In general a light mast or rack 33 is normally provided adjacent the truck cab, as illustrated, and a suitable hydraulic system including control valves 34 having remote operating levers 35 (see FIG. 2) is provided for controlling operation of the wrecker boom 31 which pivots about its base end and has associated winch means 36 for paying out and retracting cable and hook means 38 in a conventional fashion. The illustrated wrecker of FIGS. 1-3 may also include a tow sling 39 of known construction.

In addition to the conventional equipment described, the illustrated vehicle 30 is equipped with an improved wheel lift mechanism, indicated generally at 40, also controlled by the hydraulic system (valves 34 and operating levers 35) in accordance with the teachings and concepts of this invention, as will hereinafter be set forth.

Figure 4:
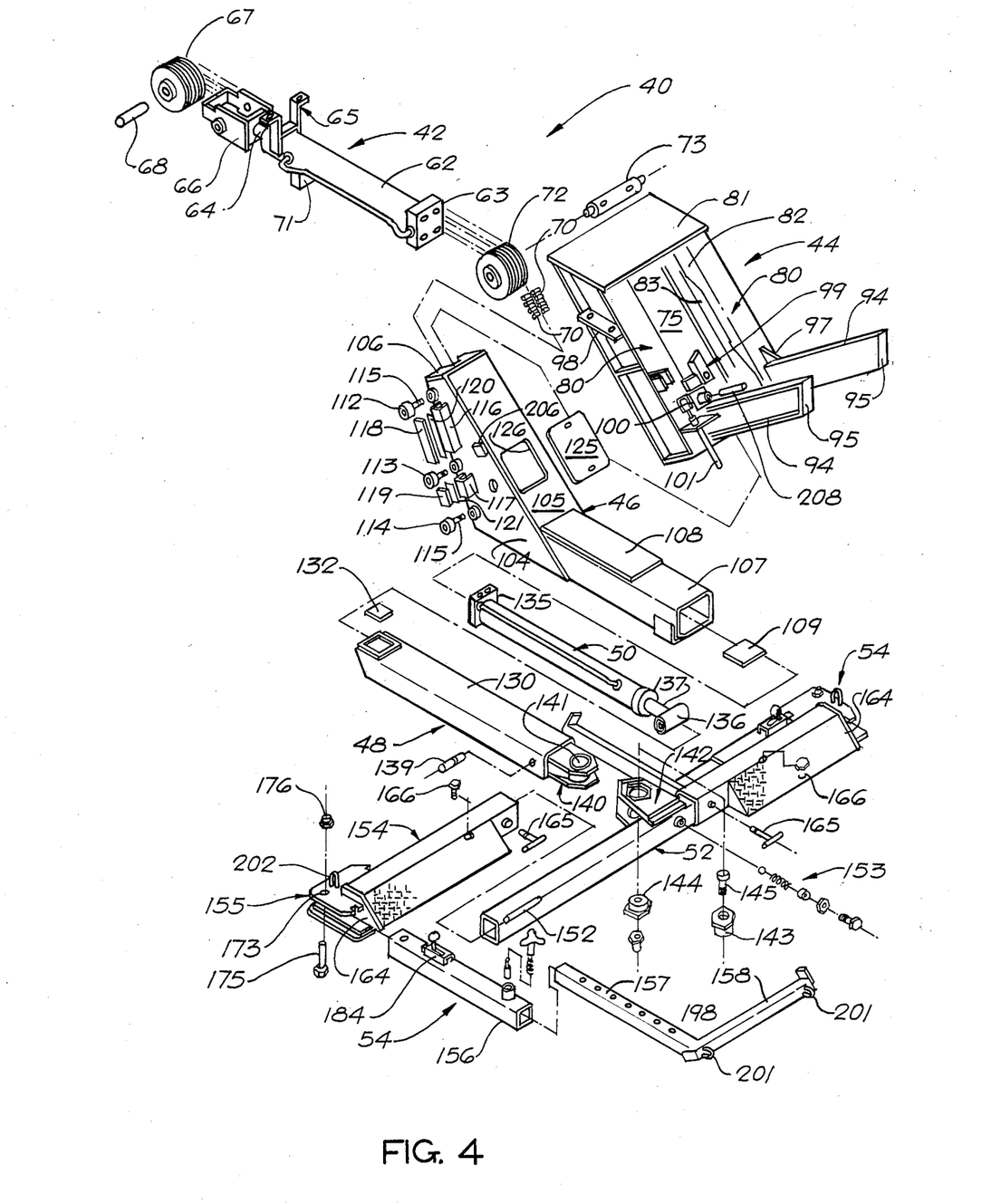
FIG. 4 is an exploded perspective view showing the principal parts of the wheel lift mechanism and wheel engaging means of this invention.

As best shown in FIG. 4, mechanism 40 in general comprises a lift cylinder assembly 42, a track assembly 44, an outer lift boom 46, an inner lift boom 48, a wheel lift extension cylinder assembly 50, a cross tree assembly 52 and wheel engagement means 54. Such elemental portions 42-54 are assembled in the manner indicated in FIG. 5 so that the wheel lift assembly 42 is disposed horizontally beneath the bed 56 of the truck body with the track assembly 44 depending angularly downwardly beneath bed 56 and tailgate apron 58, rearwardly of the truck's differential, indicated generally at 60. The inner and outer lift booms are internested, as will be explained presently, and are adapted to move along the slope of the track assembly 44 between raised and lowered positions labeled R and L in FIG. 5.

With the above generalities of organization in mind, the particulars of the several assemblies and means of the wheel lift mechanism follow in greater detail.

Lift Cylinder Assembly

With reference to FIG. 4, it will be recognized that the lift cylinder assembly 42 comprises a conventional double acting hydraulic cylinder 62 having a mounting block 63 at one end thereof and an internal piston with piston rod 64 extending from the opposite end thereof. A suitable H-shaped mounting bracket 65 is welded to the exterior of the cylinder 62 adjacent the exposed piston rod 64. The outer end of rod 64 is equipped with a rectangular shaped cage 66 for rotatably supporting a double track roller 67 on a transversely extending axle 68. A pair of lift chains 70,70 are anchored at one end to ear means 71 extending from the underside of the cylinder 62 and are trained about the exterior of the roller means 67 to extend over the upper side of the cylinder and about a second roller means 72 which is rotatably supported on axle 73 extending between mounting brackets 74 protruding from the rear wall 75 of the track assembly 44 (see FIGS. 5 and 8). The opposite ends of the two chains 70 are anchored by means 76 to the outer lift boom means 46, as will be decribed in greater detail hereinafter.

The lift cylinder assembly 42 is suspended centrally beneath the bed 56 of the truck body by the bracket means 65 and additional bracket means 77 to which the mounting block 63 of the cylinder is bolted; the two bracket means 65 and 77 being welded or otherwise rigidly fixed to structural members of the truck body framing. Thus it will be appreciated that lift cylinder assembly 42 and its lift chain means 70 are disposed in a concealed position beneath the bed 56 of the truck body, in a substantially horizontal operating position.

Track Assembly

Turning now to the features of track assembly 44, reference is made to FIGS. 4, 5-7 and 8-10. As best illustrated in FIG. 4, the track assembly comprises a pair of parallel spaced I beams 80,80 interjoined at their upper ends by a transverse planar top wall member 81 and across their operationally forward sides by the wall 75 previously noted; wall 81 being disposed in an angular intersecting relationship to the longitudinal axes of the two parallel beams 80.

Figure 8:
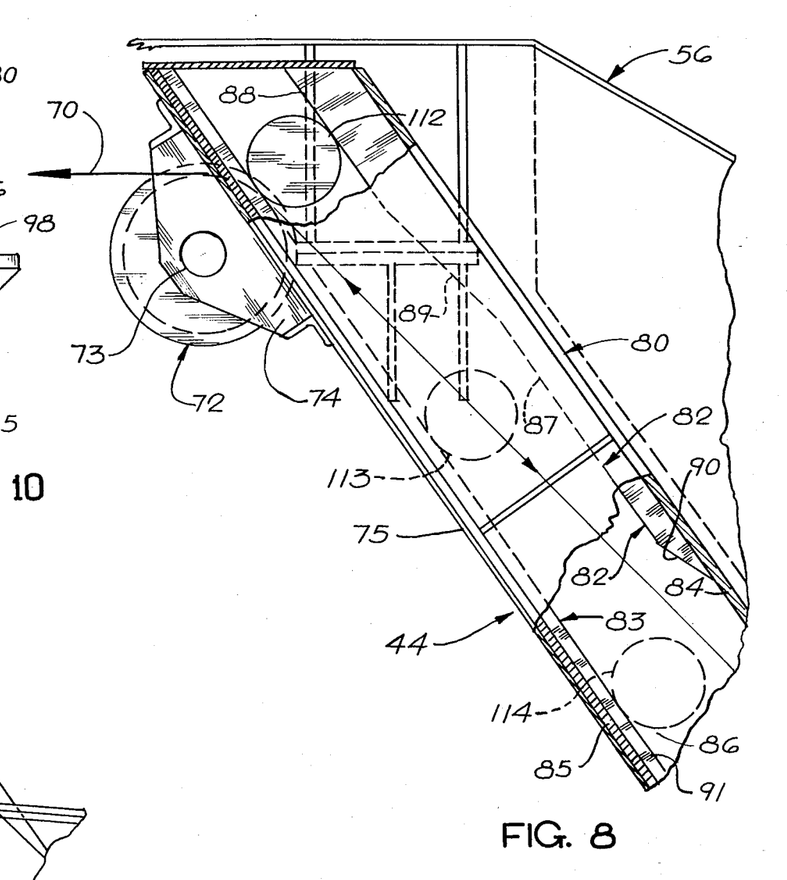
FIG. 8 is an enlarged partial side elevation with parts in section of the upper end of the track assembly.
Figures 9, 10:
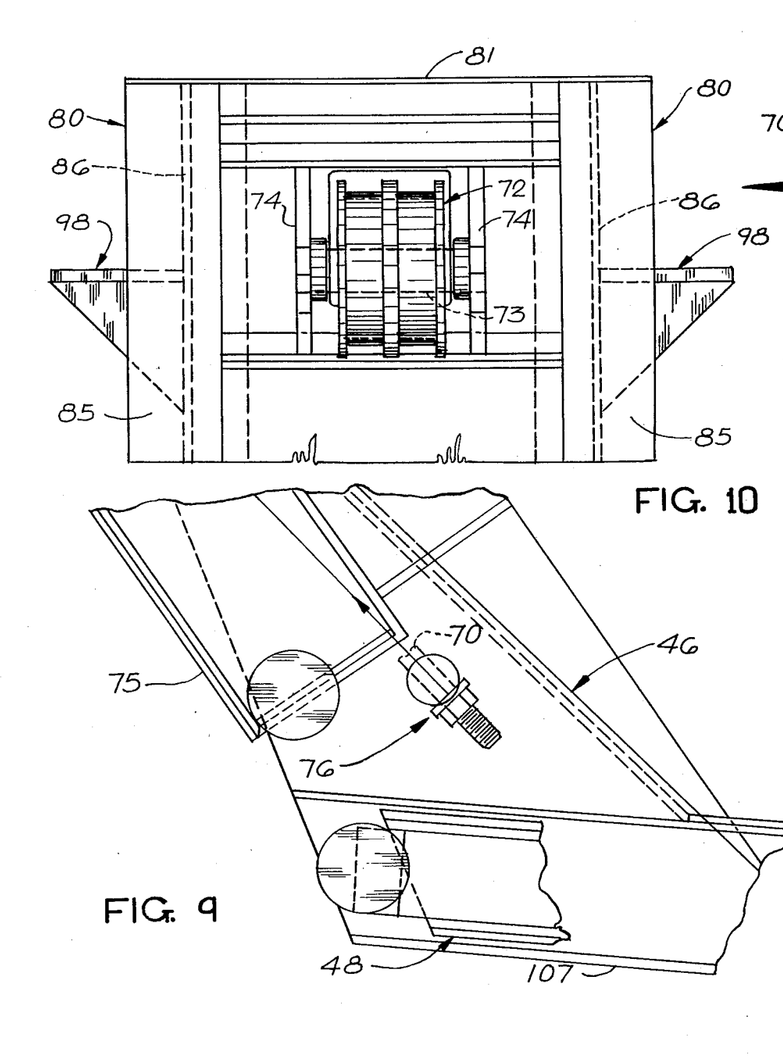
FIG. 9 is an enlarged partial side elevation of the lower end of the track assembly and outer lift boom.
FIG. 10 is an elevation of the upper end of the track assembly and lift boom.
Figures 11, 12A, 12B, 12C:
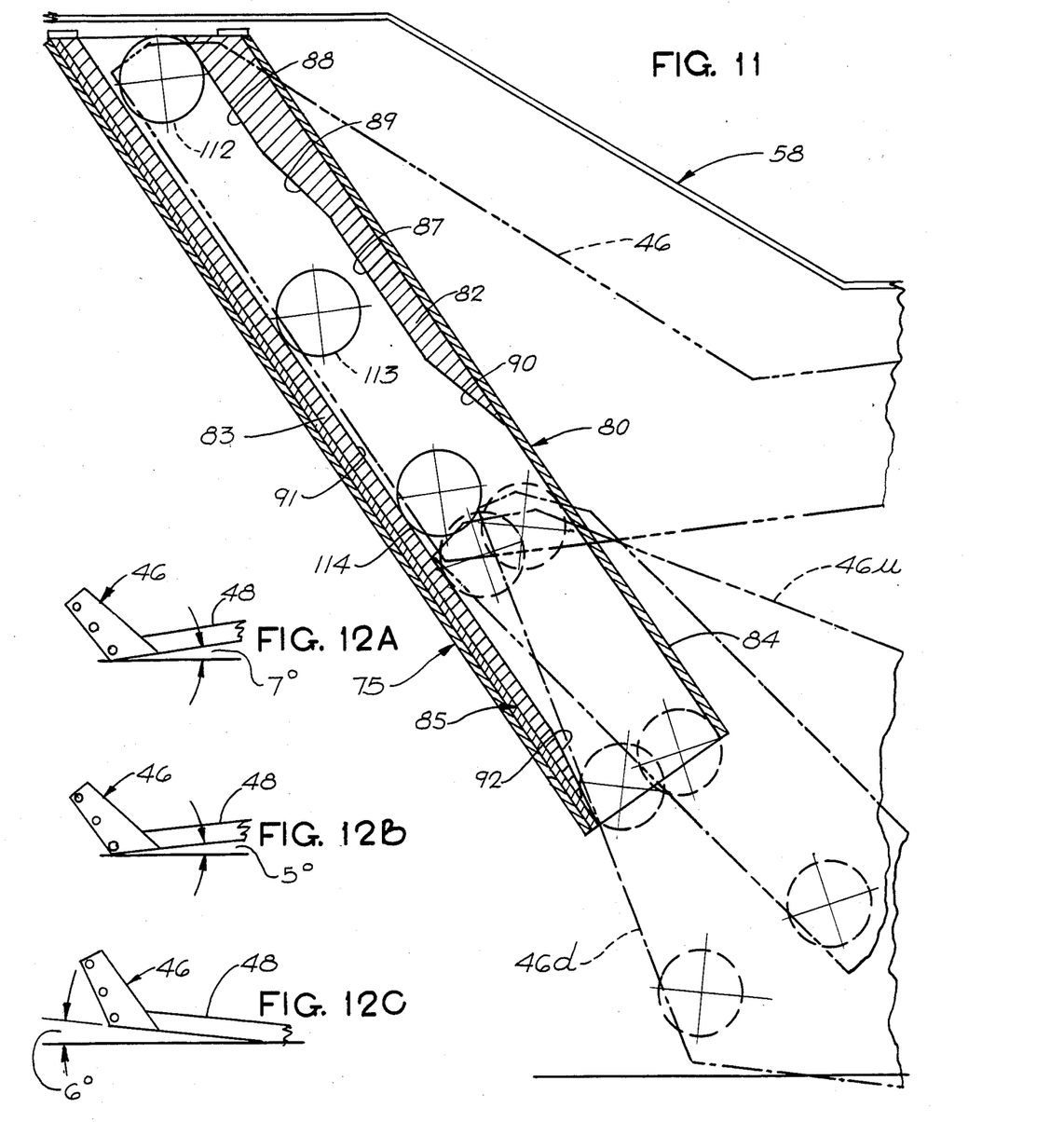

Each of the I beams 80 as best shown in FIGS. 4 and 5-8 carries cam track means comprising an upper cam track 82 and a lower cam track 83, respectively connected to the upper and lower I-beam flanges 84, and 85 as well as to 2 central web wall 86 of an associated I beam 80, as by welding or other securement means. The two cam tracks 82 and 83 are vertically spaced apart, as best shown in FIG. 8, with the upper track 82 comprising a pair of parallel linear track portions 87 and 88 interjoined by an intermediate sloping cam surface portion 89 angularly intersecting portions 85 and 86. The lower or terminal end of cam portion 85 is further intersected by a terminal sloping cam surface portion 90 extending between the surface portion 87 and the upper flange 84 of the associated I beam. The lower cam track 83 comprises a linear member extending along the inside face of the bottom flange 85 of the I beam and presents a planar cam surface 91, paralleling the cam surfaces 87 and 88 and terminated at its lower end by an intersecting sloping cam surface portion 92, as best shown in FIG. 11 of the drawings. It will be understood that each of the I beams 80 is fitted with a pair of spaced cam tracks 82 and 83 which are aligned in opposing registering relationship on the two I beams 80, in the manner best shown in FIGS. 6 and 7 of the drawings. The use and operation of the cam means 82 and 83 will be amplified in descriptive material hereinafter.

In addition to the two I beams 80,80 which carry the cam tracks as explained, track assembly 44 also includes a pair of mounting arms 94,94 (see FIG. 4) extending outwardly adjacent the lower ends of the I beams 80,80 and aligned substantially at right angles to the latter. Such arms prefereably comprise C channel beams having mounting plates 95 across their outer ends for connection with a vertical portion 96 of the vehicle's tailgate section 58 (see FIG. 5). A gusset plate 97 extends between one of the arms 94 and the upper flange 84 of the right hand I beam 80 to reinforce and strengthen the assembly. It will be noted that when mounted on the tow truck, track assembly 44 is located substantially centrally of the longitudinal axis of the truck bed with track members 80,80 being disposed on opposite sides of such central axis to depend downwardly at an angle of substantially 55° with respect to the horizontal (see FIG. 5). The track assembly 44 is supported and attached to the framework of the truck bed by mounting brackets 98 (see FIG. 10) welded to the two I beams 80,80. The mounting pads 95 at the outer ends of the support arms 94 are bolted to the vertical apron 96 of the vehicle's tailgate structure to complete the mounting thereof.

As illustrated in FIG. 4 of the drawings, track assembly 44 also is fitted with a safety latch assembly 99 comprising a pivotal latch pawl, mounting means 100 therefor attached to one of the I beams 80, and remote control means 101 for operating the pawl relative to a stop block fixed to the outer boom 46, as will be particularized hereinafter in the operational description (see FIG. 24).

Lift Boom Assembly

Figures 5, 6, 7:
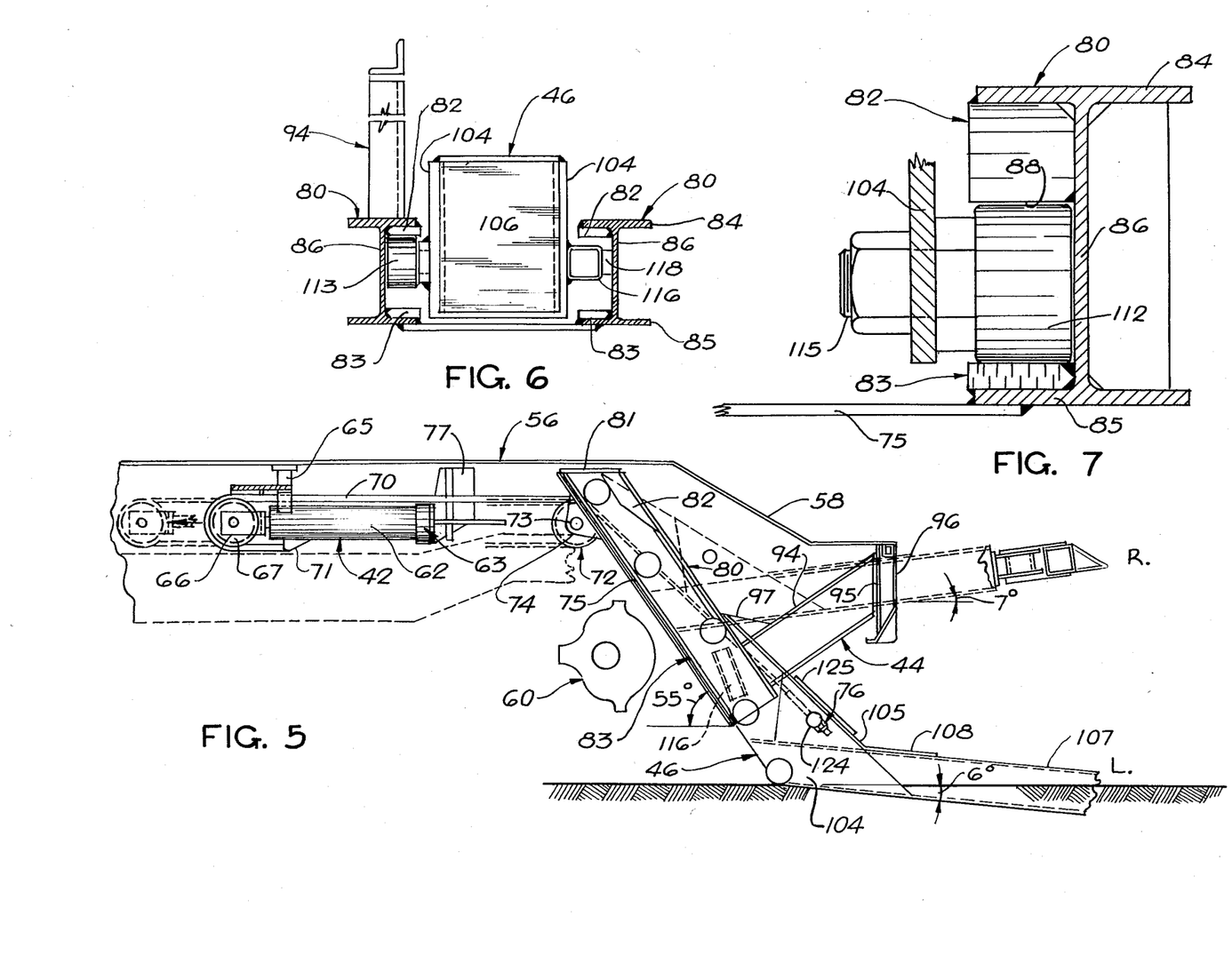
FIG. 5 is a side elevation with portions cut-away showing the operating organization of the wheel lift mechanism on a typical tow truck.
FIG. 6 is a partial end elevational view looking downwardly at track assembly and outer lift boom shown in FIG. 5.
FIG. 7 is an enlarged partial end elevation of one cam track means and cooperating follower roller of the outer lift boom and track assembly.

As will be recalled, the lift boom assembly comprises an outer lift boom 46 and an inner lift boom 48, telescopingly arranged as illustrated in FIGS. 4, and 5 of the drawings.

Outer lift boom 46 comprises a pair of substantially trapezoidal shaped side plates 104 disposed in parallel spaced relationship and rigidly interconnected by a planar front wall member 105 and an upper end wall 106. Extending forwardly of the lower end of the side wall members 104 and intersectingly passing through the front wall member 105 is a tubular extension member 107 having a reinforcing plate 108 welded to an upper face thereof and to the front wall 105. This forms a rigidified pedestal of general L-shaped configuration which is open over its backside.

Figures 13, 15, 16, 17:
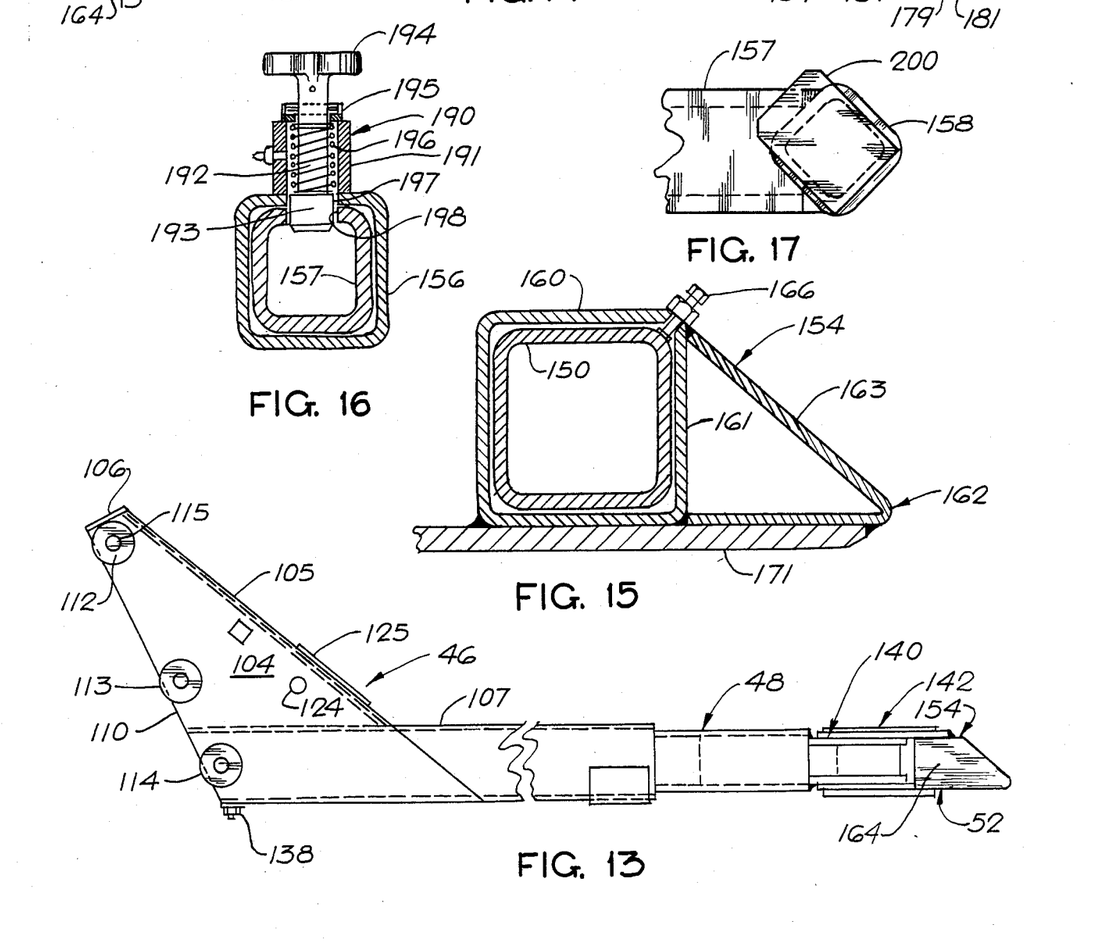
FIG. 13 is a side elevation of the assembled lift boom and wheel engaging means.
FIG. 15 is an enlarged cross sectional view taken substantially along vantage line 15—15 of FIG. 14.
FIG. 16 is an enlarged cross sectional view taken substantially along vantage line 16—16 of FIG. 14.
FIG. 17 is an enlarged partial end elevation of one of the wheel restraining means shown in FIG. 14, and looking substantially from vantage line 17—17 in that figure.
Figure 19:
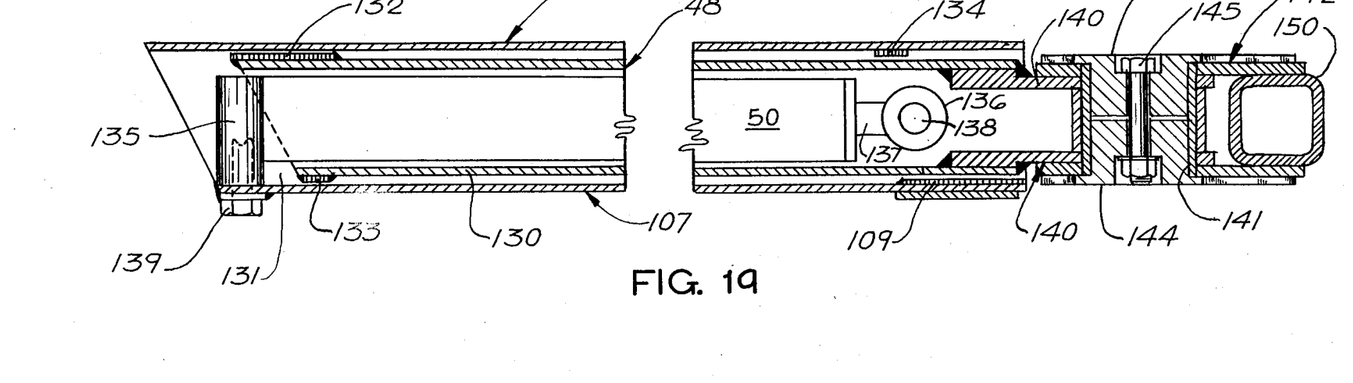
FIG. 19 is a foreshortened longitudinal cross section showing the assembled relationship of the lift boom and wheel engaging means.

Internally the tubular extension member 107 carries an outer slide pad 109 located on a bottom interior wall thereof adjacent its open outer end, as best illustrated in FIG. 19 of the drawings. As shown in FIG. 13 tubular member 107 extends past the front wall 105 of the pedestal and has its the inner end cut at an angle to match the slope of inner or rear edges 110 of the pedestal side wall members 104; the latter being welded to member 107 to provide a rigid assembly.

With specific reference to FIGS. 4, 6 and 13 of the drawings, it will be recognized that each of the side plates 104 of the outer lift boom carries three external rollers 112, 113, and 114 spaced along the length thereof and adjacent its edges 110. The rollers are rotatably mounted on axle members 115 fixed to the side plates 104, as best shown in FIG. 7. Disposed intermediate rollers 112, 113 and 114 are spaced slide rails 116 and 117 carrying slide pads 118 and 119 for engaging the central web walls 86 of the two I-beams 80, in the manner shown in FIGS. 4 and 6. Shim members 120 and 121 are provided for adjusting the lateral spacing between the slide pads 118 and 119 and the adjacent web walls to prevent engagement or rollers 112-114 with the web walls during movement of the outer boom in and along the I beams 80.

As previously noted, the outer ends of the lift chains 70,70 are secured to the outer lift boom 46 by anchor means 76. As shown in FIG. 5, anchor means 76 is disposed interiorly of the hollow lift boom pedestal adjacent its front wall member 105 and comprises adjustable clevis means carried on a cross bar or rod 124 extending transversely between the two side wall members 104. A suitable trap door 125 is provided over opening 126 in front wall 105 to provide access to anchor means 76 for purposes of adjusting the tension of the two lift chains 70,70 as required.

It will be understood from the foregoing description and examination of FIG. 5 in particular, that when the outer boom 46 is assembled with the track assembly 44, opposing pairs of rollers 112, 113 and 114 on opposite sides of the outer boom ride between the opposing cam tracks 82 and 83 on opposite sides of the track assembly 44. Thus activation of the lift cylinder and piston assembly 42 by tensioning or relaxing the lift chains 70,70, respectively raises or lowers the lift boom assembly. During such movement the several rollers 112–114 on boom 46 move in and along the cam tracks with the slide rails 116 and 117 and pads 118 and 119 preventing the rollers from engaging the central web walls of the beam members 80 to maintain the outer boom assembly centrally of the track assembly 44 during operational movements. 10 The inner lift boom assembly 48, as best shown in FIGS. 4 and 19–21, comprises a tubular body member 130 of generally rectangular cross sectional confirguration adapted to telescopically fit within the tubular extension 107 of the outer lift boom 46.

Tubular member 130 is cut at an angle at its inner end, as indicated at 131, and carries slide pads 132 and 133 on the upper and lower sides thereof. Such pads, in cooperation with the previously mentioned wear pad 109, on the bottom wall of member 107 and additional wear pads 134 depending from the upper interior wall of tubular member 107, constitute a system for guiding movements of the inner lift boom coaxially of the outer lift boom member 107.

Wheel Lift Extension Assembly

In order to effectuate coaxial relative movement between the inner lift boom and the tubular member 107 of the outer lift boom, an extension piston and cylinder assembly 50 is mounted coaxially within the interior of the hollow tube member 130 (see FIG. 19). Assembly 50 is fitted with a mounting block 135 at the operationally inner end of its cylinder and with a cylindrical journal 136 carried at the outer end of an associated piston rod 137 adjacent the outer end of inner lift boom 130. Suitable pin means 138 extends laterally across the inner boom member 130 and passes coaxially through the journal 136, thereby to secure the piston to tubular member 130. At the other end of assembly 50, the mounting block portion 135 is secured to the bottom wall of the outer lift boom member 107, as by bolts 139. The extension cylinder assembly 50 of course has suitable connection with and is operably controlled by hydraulic control members and valve means associated with the previously described hydraulic system carried on the truck body (see FIGS. 1–3).

Figure 20:
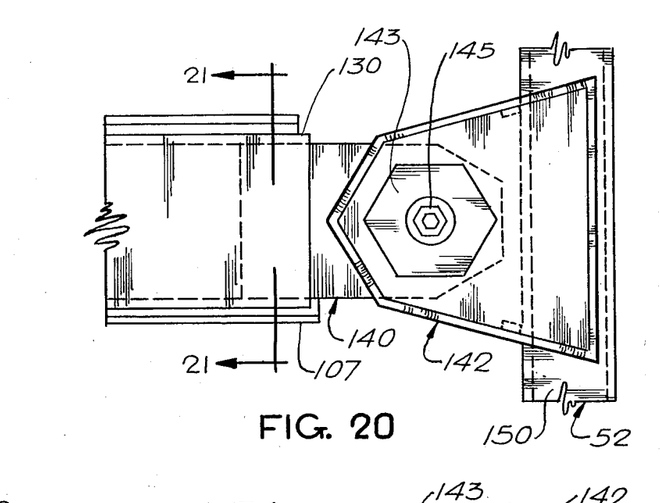
FIG. 20 is an enlarged partial top plan view showing the pivotal connection between the lift boom and wheel engaging means shown in FIG. 19.
Figure 21:
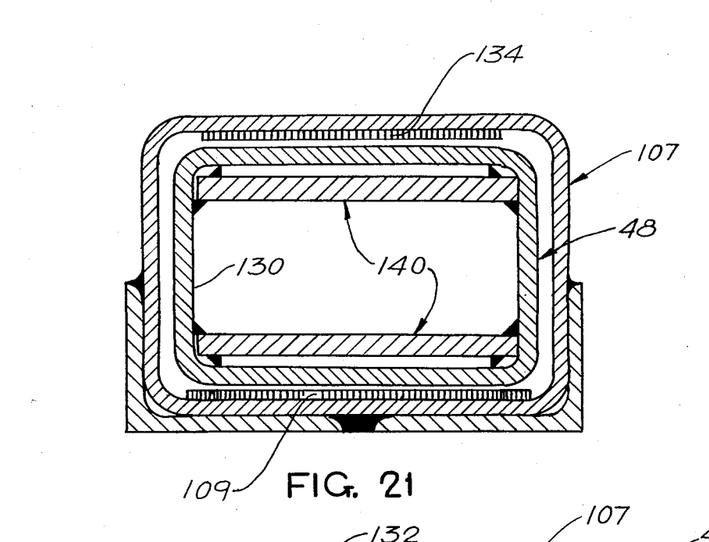
FIG. 21 is a cross sectional view taken substantially along vantage line 21—21 of FIG. 20.

Fixed to the outer end of the inner lift boom member 130 and extending outwardly therefrom are parallel pivot support plates 140,140, transversely interjoined by an operationally vertical cylindrical bushing 141. Spaced pivot ears 142, affixed centrally to the cross tree assembly 52, extend over plates 140 and bushing 141 and are provided with enlarged openings to receive pin members 143 and 144 which fit into the bushing 141. Pins 143, 144 are held in coaxial alignment by a central through bolt means 145, as best shown in FIGS. 19 and 20. This assembly provides a rugged pivot structure permitting pivotal movement of the cross tree assembly about the outer or distal end of the inner lift boom 48.

With the above described arrangement, extension and retraction of the wheel lift extension assembly 50 serves to axially extend and retract the inner boom relative to the tubular member 107 of the outer boom, thereby respectively moving the cross tree assembly 52 away from and toward the tailgate of the tow truck, as selected.

Cross Tree Assembly

Cross tree assembly 52 as illustrated in FIGS. 4, 14, 15, 19 and 20 comprises an elongated rigid tubular member 150 of substantially square cross section having the spaced pivot ears 142 extending substantially from its midpoint. Member 150 is fitted with a pair of stop rods 152,152 adjacent its opposite ends for purposes which will appear presently. A detent assembly 153 comprising a spring loaded ball is mounted centrally of member 150 to cooperate with an opening (not shown) in the tube spacing plates 140, to removably hold the cross tree at right angles to the inner lift boom as desired. The cross tree also is moveable arcuately about the pivot means for purposes of aligning the wheel engaging means 54 with the wheels of a disabled vehicle and when cornering a towed vehicle.

Wheel Engaging Means

Wheel engaging means 54 comprises left and right hand wheel restraint assemblies of identical construction mountable on opposite ends of the tubular cross tree member 150 for operational cooperation therewith when engaging and restraining the wheels of a disabled vehicle.

As shown in FIG. 4 of the drawings, the right hand wheel restraint assembly 54 is folded in a stored condition while the left hand assembly is shown in exploded perspective to illustrate its elemental parts. Specifically, each wheel restraint assembly comprises a wheel chock means 154 having a pivot assembly 155 at one outer end thereof for pivotal attachment of an outer restraint tube 156 which carries a telescoping inner tube 157 therein. A rigid wheel restraint bar 158 is fixed transversely to the outer end of tube 157. Organization of elements is such that the two chock means 154 slide longitudinally and coaxially over the cross tree member 150 while each of the wheel restraint assemblies comprising restraint tubes 156, 157 and restraint bar 158 swings about its associated pivot assembly 155 between a stored position (see right hand assembly in FIG. 4) and a wheel engaging condition wherein the restraint bar 158 lies parallel to and cooperates with a chock means 154 to restrain a vehicle wheel therebetween.

In greater particular, reference is made to FIGS. 13–18 of the drawings showing the details of means 54.

As illustrated therein, the wheel chock means 154 comprises an outer tube 160 of generally square cross sectional configuration and of a size sufficiently large to accommodate coaxial reception of the cross tree tube 150 therewithin. Attached to one wall 161 of tube 160 is an angularly bent ramp member 162 of a length just slightly shorter than tube member 160 and which has an inclined wheel engaging wall 163 having a roughened surface. The ramp and tube members 160 are welded together (see FIG. 15) and fitted with an end plate 164 to cap over the outer open end thereof. Adjustable positioning of the chock means 154 along the cross tree tube member 150 is achieved by a threaded lock bolt 165 of T configuration adapted to engage a threaded nut member welded to wall 161 of the outer tube member 160. Inward threaded movement of bolt 165 engages the underlying cross tree member 150 to lock the assembly 154 in selected positions therealong. Reverse movement of the bolts 165 releases the assemblies 154 for sliding movement on the cross tree.

It will be recalled that the cross tree member is provided with two elongated stop rods 152 adjacent its outer ends. Each such rod is engaged by the inner end of a stop bolt 166 threaded through one upper corner of an outer tube member 160 to interferingly engage a rod 152 (see FIG. 4). With this arrangement extending sliding movement of the two chock assemblies on the cross tree is limited by engagement of the bolts 166 with the stop rods. This prevents accidental removal of the slidable chock means from the cross tree.

Figures 22, 23:
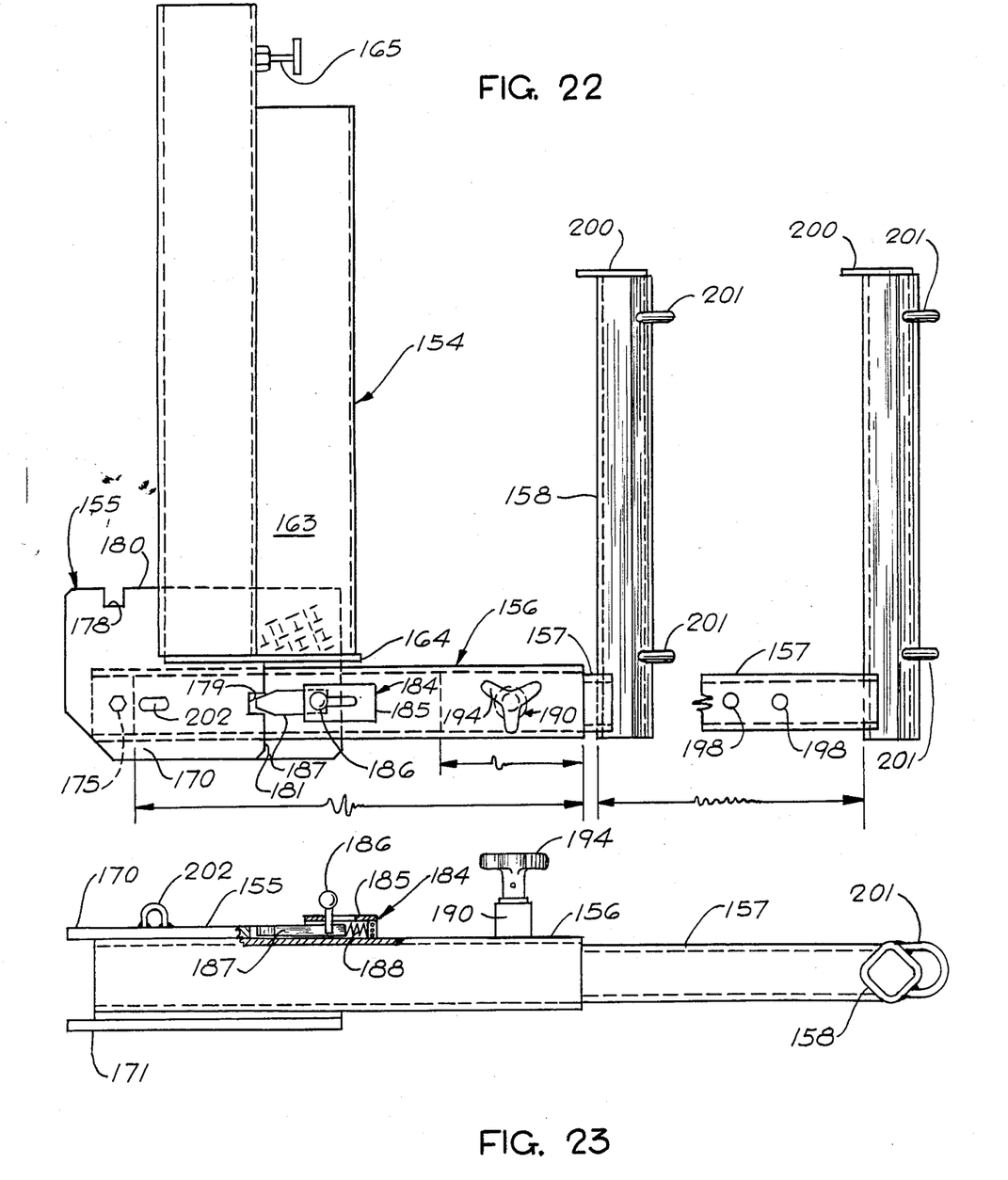
FIG. 22 is an enlarged partial plan view of wheel engaging means shown in FIG. 14, and illustrating operational positioning of parts thereof.
FIG. 23 is an enlarged side elevation of the wheel engaging means shown in FIG. 22.

As previously noted, a pivot assembly 155 is secured to the outer end of each of the chock means 154; each pivot assembly 155 comprising superposed planar upper and lower pivot plates 170, 171 welded to the end wall 164 of the chock means as well as to the associated tube 160 (see FIG. 22-23). The lower pivot plate 171 is also welded to the lower side of the tube 160 and ramp 162 (see FIG. 15) to act as a wear plate. Each pair of pivot plates 170, 171 is provided with coaxial aligned openings 173, receptive of a pivot pin 175 having a threaded outer end receptive of a lock nut 176 (see FIGS. 4, 15, and 22).

Figures 14, 18:
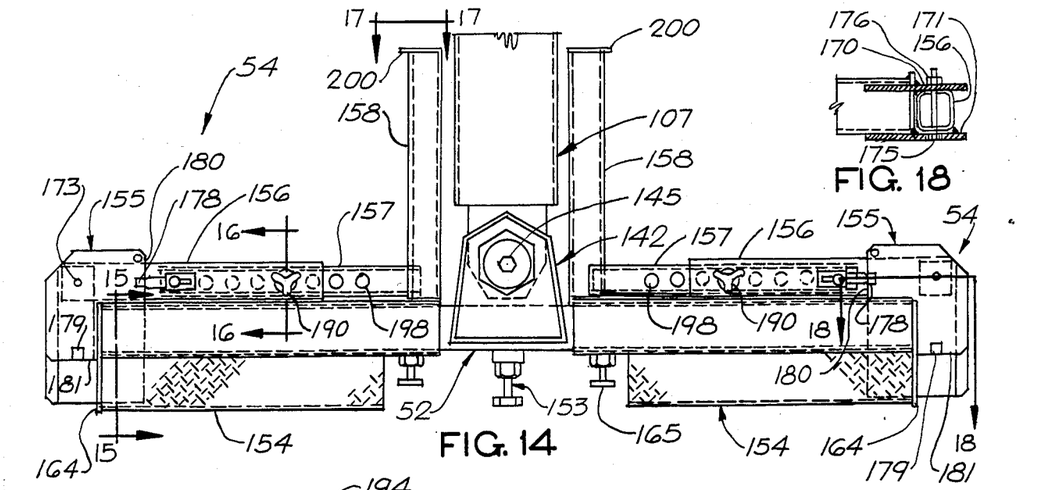
FIG. 14 is an enlarged partial top plan view of the wheel engaging means and associated lift boom assembly.
FIG. 18 is a partial cross sectional view taken substantially along vantage line 18—18 of FIG. 14.

The upper pivot plates 170 further are formed with notched openings 178 and 179, the axes of which are aligned at right angles to one another and which extend inwardly of transverse edges 180 and 181, respectively, of the upper pivot plate (see FIGS. 14 and 22). Such notched openings are provided for purposes of securing the restraint assemblies (comprising the tubular members 156-158) in stored or operating positions.

As illustrated in FIGS. 4, 14, 18, 22 and 23, the outer tube member 156 of each restraint assembly is pivotably connected by means of the pivot pin 175 to and between the two pivot plates 170 and 171. This permits the restraint assemblies to move through a arc of substantially 270° between a stored position of parallelism behind each wheel chock assembly 154 and an operating position transversely across the outer end thereof. These two extreme positions are represented best is FIGS. 14 and 22 of the drawings. Mounted on the upper wall of the tubular member 156 of each wheel restraint assembly is a manually operable latch means 184 comprising a housing 185, manually engageable knob means 186 and a spring biased latch bolt 187 slidable between an extended latching position, as illustrated in FIG. 22, and a unlatched position as shown in FIG. 4. In the latched position the outer end of the latch bolt 187 is adapted to engage either one of the notches 178 and 179 in an adjacent upper pivot plate, thereby locking the related tubular member 156 in operating or stored position as selected.

In addition to the latch assembly 184 each outer wheel restraint tube 156 carries a plunger lock assembly 190 (see FIGS. 16, 22 and 23). As specifically shown in FIG. 16 the plunger lock assembly 190 comprises a cylindrical housing 191, journaling a vertically moveable plunger rod 192 having an enlarged plunger head 193 at its lower end and an operating handle 194 at its upper end. A retention cap 195 surrounds the plunger rod 192 at the upper end of the housing 191 to retain a spring means 196 against the plunger head 193 thereby to bias the plunger downardly. Assembly 190 is secured to the upper wall of the outer wheel restraint tube 156 coaxially over an opening 197 for passage of the plunger head 193 therethrough.

Each inner tubular wheel restraint member 157 is provided with a plurality of spaced openings 198 in its upper wall for entry of the associated plunger head 193 in operation whereby to lock the inner tubular member 157 at desired axial positions with respect to the outer tubular member 156, in the manner best depicted in FIG. 16 of the drawings.

Such axial adjustment of the inner and outer tubular restraint members 157 and 156, respectively, is for the purpose of adapting the wheel restraints to different size wheels and tires of the vehicle being towed. In a particular preferred arrangement illustrated, with one of the holes 198 of the inner tubular member 157 exposed beyond the outer end of the related outer tube member 156, and with the restraint assembly in its wheel engaging position shown in FIG. 22, the distance between the rigid restraint arm 158 and opposing wheel chock assembly 154 accomodates a 13" tire; with two holes exposed a 14" tire, with three holes exposed a 15" tire and four holes exposed a 16" tire, etc.

As noted above, the wheel restraint arm 158 is fixed at right angles to the outer end of the inner tubular restraint member 157; the same extending laterally therefrom a distance sufficient to accomodate at least the width of the vehicle tires to be engaged. Arm member 158 preferrably is formed as a square, rigid metal tubular member as illustrated in FIG. 17, welded to the outer end of the inner tubular restraint member 157 so that the planar faces of arm 158 are aligned substantially at 45° to the horizontal. The extreme outer end of each tubular member 158 is fitted with a projecting plate 200 extending transversely across its outer end to provide a lateral barrier to an adjacent tire.

Once the wheel restraints are in operative position adjacent the vehicle wheels a safety strap of known structure (not shown) may be employed to tie down the wheels. To facilitate that procedure the restraint arms 158 are fitted with a pair of laterally spaced pad eyes 201 and a similar pad eye 202 is mounted on each upper pivot plate 170. The pad eyes provide anchor means for attachment of the tie down straps thereby securing the vehicle wheels to the wheel engaging means.

Use and Operation

Having described the elemental portions of the improved wheel lift mechanism according to this invention, its use and operation will best be understood from examination of FIGS. 11, 12, 24 and 25 of the drawings.

As particularly shown in FIG. 11, when the lift boom is in a fully raised position in response to tensioning of the lift chains 70,70, rollers 112, 113, and 114 thereon are engaged with the lower cam member 83 for movement substantially parallel to the longitudinal axes of the two track supporting I beams 80. In this state the uppermost rollers 112 are located substantially at the throat of the cam tracks provided between the pairs of opposing cam members 82 and 83 and the inner lift boom and projecting portion of the outer boom are tilted upwardly substantially 7° about the horiztonal, as depicted in FIG. 12A.

As the lift cylinder assembly 42 is actuated to withdraw its piston and thus pay out the lift chains 70,70, the lift boom assembly with attached cross tree and wheel engaging assemblies is gradually lowered by gravity with rollers 112-114 riding along the lower cam track 83 until the uppermost rollers 112 reach the sloping ramp portions 89 of the upper cam tracks 82. At this point gravity and the geometry of the boom assembly cause the upper wheels 112 to disengage from the cam track surfaces 88 and move into engagement with the ramp portions 89 of the upper cam tracks. This causes a downward tilting or clockwise pivotal activity of the lift boom assembly about the lower roller wheels 114. By the time that the upper roller wheels 112 reach the bottom of the ramp portions 89 to engage the adjacent linear ramp portions 87 of the upper cam track, the lower wheels 114 reside substantially at the threshold of the terminal ramp portions 92 associated with the lower cam tracks 83. At this stage the clockwise pivoting activity of the boom assembly is such that the inner lift boom lies at an angle of substantially 5° to the horizontal as illustrated in FIG. 12B. This condition generally represents a mid travel position for the boom assembly.

As the lift chains 70 continue to pay out in response to retraction of the lift cylinder piston, the lift boom assembly continues to lower under force of gravity and continues to pivot in a clockwise direction as shown in FIGS. 11 and 12 until the boom assembly engages the ground. At this stage of operation the lower roller wheels 114 have moved along the lower ramp sections 92 and beyond the open lower end of the track assembly; the intermediate rollers 113 are engaged with the ramp portions 92 and the upper roller wheels 112 are engaged with the inside of the I-beam flange portions 84 as shown in dotted lines in FIG. 11. Assuming that the ground level is substantially horizontal, the clockwise rotation of the lift boom that has taken place during the described lowering operation will be substantially 7° as it passes from the fully raised condition of FIG. 12A to a horizontal ground engaging position.

If the ground level is at a down slope, the lift boom assembly will continue to tilt downwardly in a clockwise direction about the upper roller wheels 112 until the intermediate roller wheels 113 engage the inside of the lower flanges 85 of the track I beams. This condition is indicated in FIG. 12C in which the downward tilt of the lift boom is limited to substantially 6° below horizontal as there illustrated (see dotted position 46d in FIG. 11).

Figure 12D:
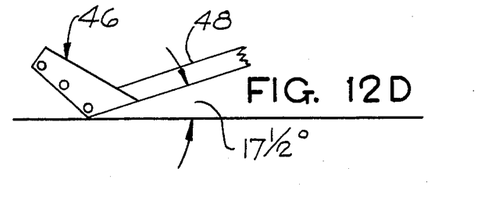

On the other hand, if the ground slope is upwardly at a opposite tilt from that depicted in FIG. 12C, the lift boom will assume the upslope of the ground to a maximum of 17-½° from horizontal, as illustrated in FIG. 12D. This latter condition is brought about by counterclockwise tilting movement of the lift boom relative to the I beams 80. In this condition the upper roller wheels 112 reengage the lower cam tracks 83, the intermediate rollers 113 engage the underside of the upper I-beam flanges 84 and the lower roller wheels 113 are disposed outwardly beyond the lower ends of the I beams 80 as indicated at position 46u in FIG. 11.

During the raising activity of the lift boom, brought about by tensioning of the lift chains 70, 70 and extension of the lift piston and cylinder assembly 42, substantially the reverse of the above described movement activity takes place with rollers 113 and 114 moving upwardly across the terminal ramp portions 92 of the lower cam tracks 83 until the upper rollers 112 reengage the sloping ramp portions 90 of the upper cam tracks 82. At this point in the movement evolution, the lift boom tilts upwardly in a counterclockwise direction reaching a position of substantially 5° to the horizontal. When the upper wheels 112 engage the cam portions 89 of the cam tracks 82, the boom tilts to its fully raised position of FIG. 12A wherein the inner boom is inclined substantially 7° above horizontal.

Due to the above described activity of the rollers 112–114 in and along the opposing cam track means 82 and 83, it will be appreciated that tilting activity of the lift boom during lowering operation effectively provides a range of tilting movement of substantially 23-½°. Similarly the raising movement of the lift boom assembly, particularly at engagement of the ramp portions 90 and 89 by roller members 112, effect uptilting or counterclockwise activity of the lift boom to raise the engaged end of a vehicle captured in the wheel restraining grid system. This controlled tilting activity of the lift boom is most desirable from an operational standpoint and eliminates the need for a separate heavy tilt cylinder between the lift boom and the wheel engaging mechanism as in the prior art. Thus that objective of this invention is achieved.

Safety Latch

It will be recalled that track assembly 44 is fitted with a safety latch means 99 which cooperates with the boom assembly during the raising and lowering movements thereof as will now be explained with particular reference to FIG. 24 of the drawings.

In a wheel lift system of the order herein described and presented by prior developments in this art, there is always the possibility that a failure in the raising or holding mechanisms can cause a towed vehicle to be dropped to the road during transit, resulting in a very dangerous condition. Even though the presently described mechanism preferably is powered by a hydraulic system including holding valves in the lift cylinder assembly 42, there still remains the off-chance that a piston seal or lift chain failure could occur which might cause the wheel lift mechanism to drop or fall unexpectedly. Experience has demonstrated that the use of manually operable pins or stops to hold the wheel lift assembly in a raised condition are ineffective because they require operator operation and surveillance on a consistant basis. Thus, there is a need and requirement in this art for an effective wheel lift safety lock system that is capable of being consistantly engaged when a vehicle is raised to a towed position and which does not interfer with normal operation of the lift mechanism.

Figure 24:
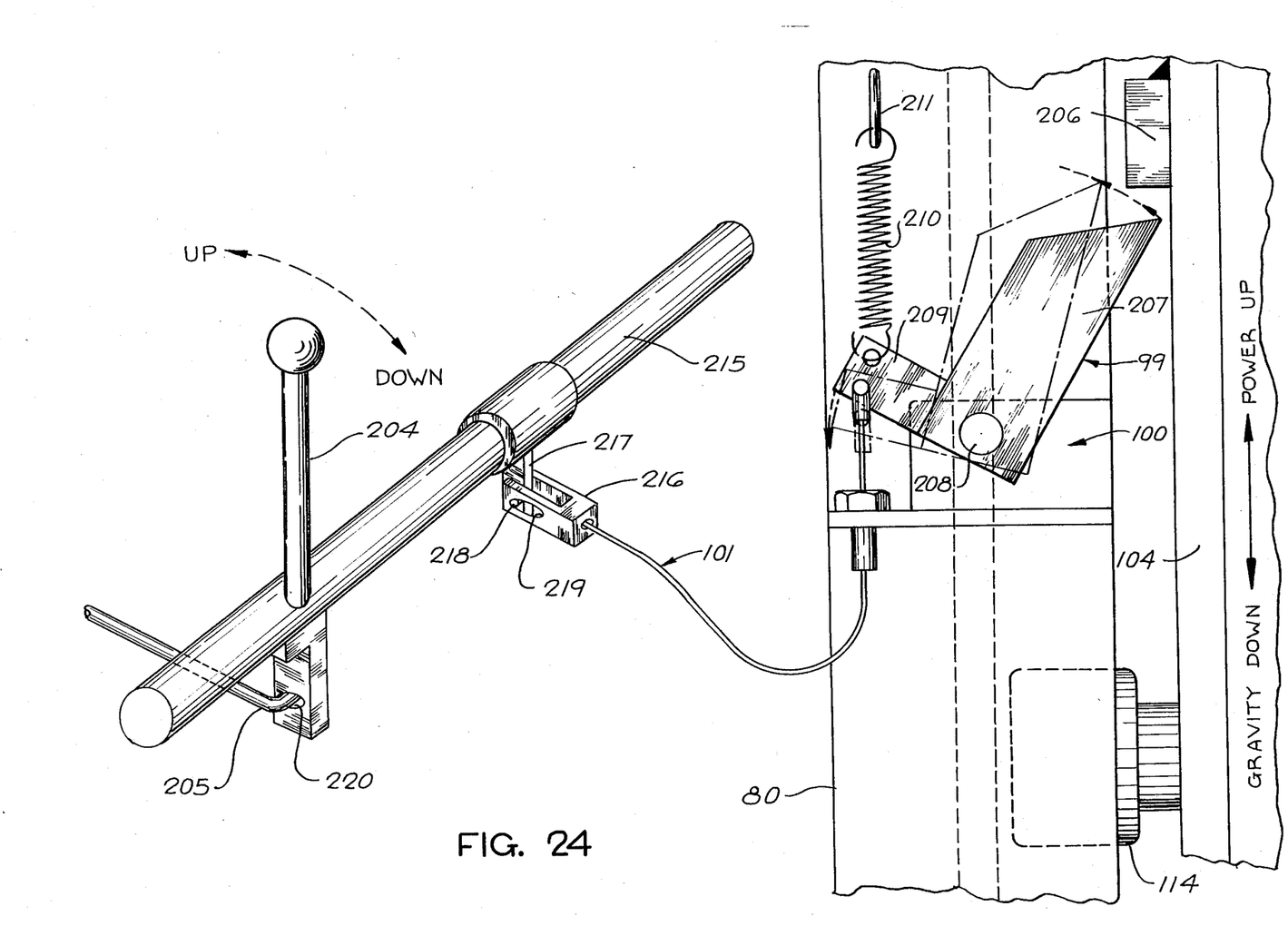
FIG. 24 is a schematic view with portions in perspective, illustrative of the safety latch system employed with the lift boom.

The safety latch means 99 as shown in FIG. 24 in particular, is designed to interferingly lock the lift boom assembly against falling automatically every time the boom assembly is raised from ground engaging level to a minimum tow height position and conversely is designed automatically to disengage the boom in response to lowering operation of the boom assembly.

After a vehicle is coupled to the wheel engaging assembly heretofore described, it is normally raised to a towing position for transport. To that end the remote operating controls 35 associated with the tow truck's hydraulic system include an up-down control lever 204 for operating the lift mechanism, which lever is manually moved to an "up" position to raise the disabled vehicle. Such movement of lever 204 causes an attached valve control rod 205 to pull on a control valve spool of the hydraulic system (not shown) in order to direct hydraulic fluid to the wheel lift cylinder and tension the lift chains 70,70 coupled to the outer lift boom. As the lift cylinder assembly 42 extends its piston rod, outer lift boom 46 is pulled upwardly along the track I-beams 80 to raise the lift boom assembly toward its fully raised position, depicted in FIG. 12a. At a predetermined elevation of the lift boom assembly, a stop block 206, welded to the outside of one of the trapezoidal side walls 104 of the outer lift boom assembly, interferingly engages a latch member or pawl 207 pivotally supported on the mounting bracket 100 by a pivot member 208. The latch pawl, as indicated in FIG. 24, is formed as a bell crank and includes an extending arm 209 to which one end of a spring member 210 is attached; the other end thereof being attached to anchor pad 211 welded to an adjacent I-beam 80. Spring 210 urges the latch pawl 207 clockwise as viewed in FIG. 24. When the stop block engages the spring loaded latch pawl, continued upward movement of the outer lift boom pivots pawl 207 in a counter-clockwise direction, permitting the stop block to escape past the upper end of the latch pawl. As soon as the stop block is disposed above the latch pawl the latter is returned to its interfering position of FIG. 24 by the spring means 210. This causes the latch pawl to strike the adjacent wall 104 of the outer lift boom with a distinctive sharp noise, audibly indicating to the operator that the safety latch is in an engaging postion beneath the stop block 206. If the lift boom assembly should thereafter accidently fall due to failure of the hydraulic system, for example, the presence of the latch pawl beneath the stop block 206 prevents accidental lowering of the lift boom assembly therepast.

To disengage the safety latch means when lowering the lift boom, it is necessary that the latch pawl 207 be swung out of its FIG. 24 position to allow the stop block 206 to move therepast. Moreover it is equally necessary that movement of the latch pawl to such a noninterferring position occur before any appreciable downward movement of the outer lift boom takes place. To this latter end, as the wheel lift up-down control lever 204 is moved to its "down" position, as indicated in FIG. 24, a cross control rod 215 is rotated clockwise with lever 204. This produces a pulling motion on a clevis 216 attached to rod 215 by an arm 217 having a transverse connecting pin 218 moveable in and along a slotted opening 219 in the clevis. Engagement of pin 218 with the left hand end of the slotted opening 219, as viewed in FIG. 24, serves to effectively pull the remote control means 101 constituting a boden wire cable or the like, connected to arm 209 of the bell crank latch pawl. This activity effectively rotates the latch pawl counter-clockwise (FIG. 24) to a noninterferring position with respect to the stop block 206.

During this motion the valve control rod 205 associated with control lever 204 moves in and along a slotted opening 220 by which rod 205 is connected to lever 204. This action delays movement of the hydraulic fluid control valve spool (not shown) forming an active part of the hydraulic lift cylinder assembly 42. When the control rod 205 reaches the right hand end of the slotted opening 220 rod 205 is actuated to activate the control valve spool, initiating lowering movement of the lift boom assembly. As this occur the piston of lift assembly 42 retracts and the outer lift wheel boom is lowered along the cam tracks and I-beams 80. However by this stage of the operation, the latch pawl has already swung to a noninterferring position with respect to the stop block 206, permitting the latter member to move past the latch pawl 207. The slotted opening 219 in clevis 216 permits movement of the cross control rod 215 and latch pawl control cable connection during latch engaging motion of pawl 207 produced by the spring means 210.

With the aforedescribed safety latch arrangement, it will be understood that positive acting means is provided for avoiding accidental falling or lowering of the lift boom assembly while at the same time automatic lowering of the assembly may take place without interference from the safety latch system.

Figure 25A:
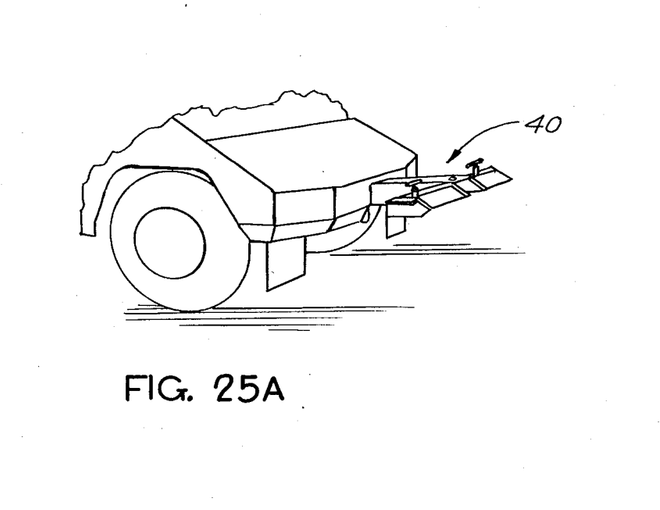

Turning now to the sequential operational views illustrated in FIG. 25 it will be noted that FIG. 25A illustrates the normal fully raised and stored position of the lift mechanism 40 in which the wheel engaging assemblies 54, are shown folded in a stored condition behind the cross tree 52.

Figure 25B:
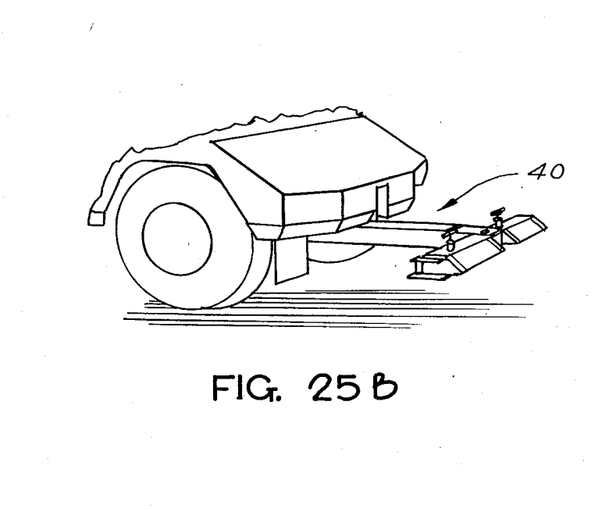
Figure 25C:
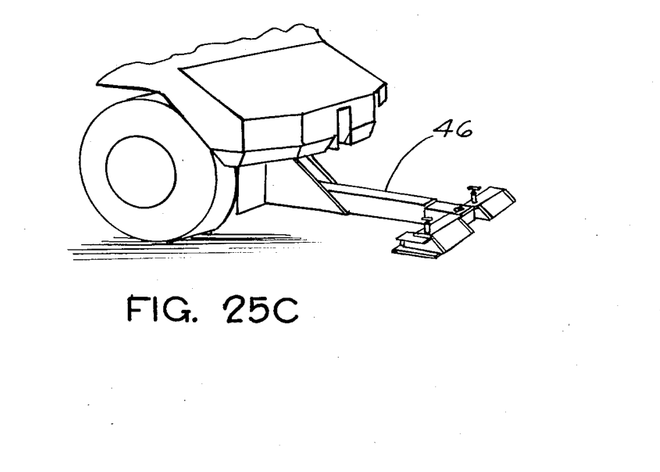

FIG. 25B illustrates the assembly 40 in an intermediate position of its movement toward a fully lowered position, as indicated in FIG. 25C.

Figure 25D:
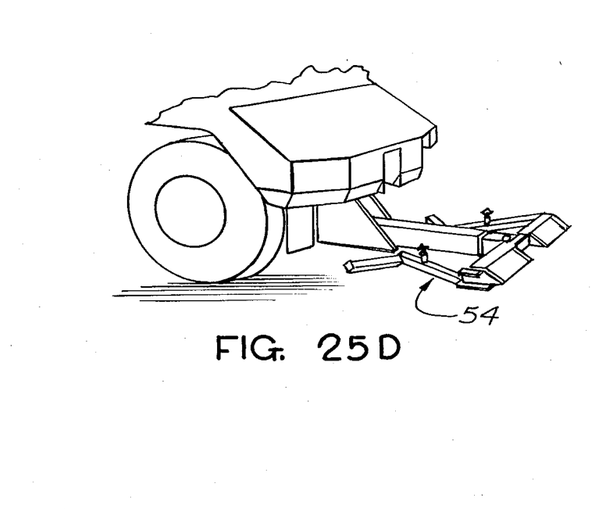
Figure 25E:
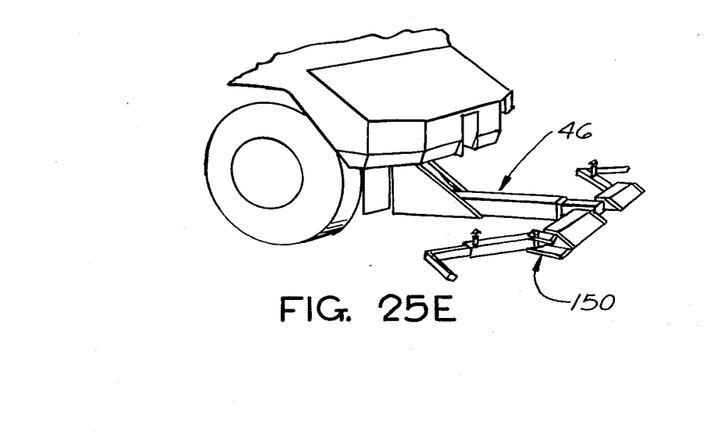
Figure 25F:
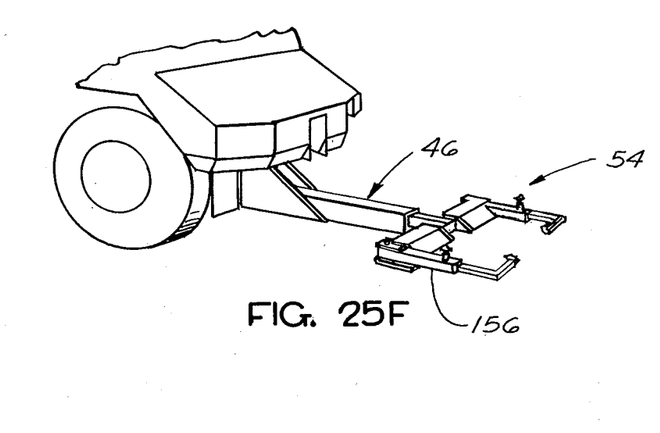

In FIGS. 25D and 25E the wheel engaging assemblies 54 are shown in a partially unlimbered state to demonstrate how the tubular members 156 pivot about their pivot means 155 to reach a fully opened state as indicated in FIG. 25F.

Figure 25G:
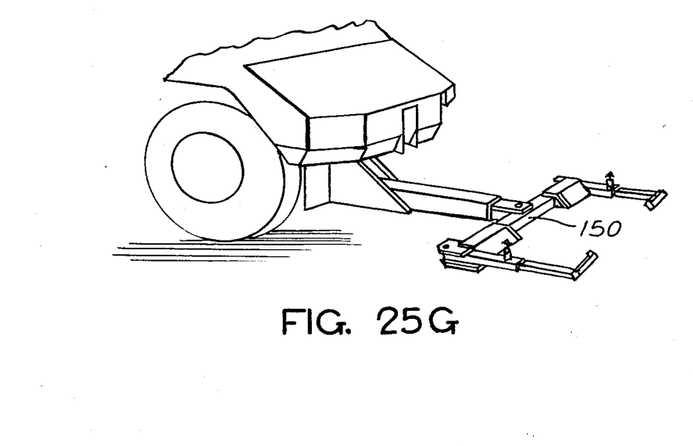

FIG. 25G illustrates the lateral extension of the slidable wheel chock assemblies 154 to desired axial positions on the tubular cross tree member 150.

Figure 25H:
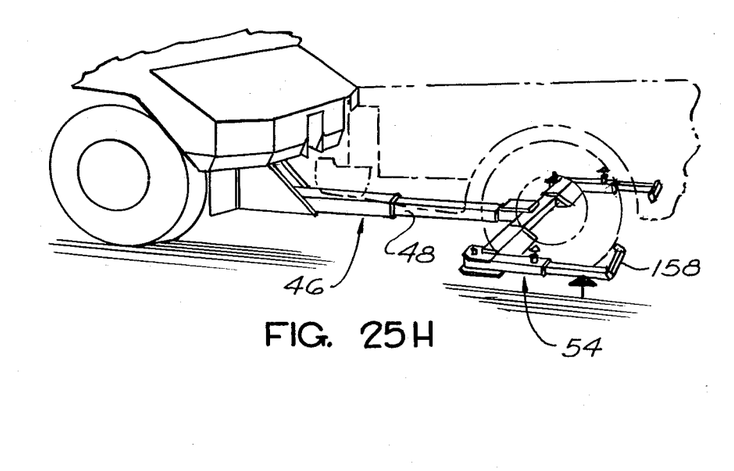

FIG. 25H indicates the extended position of the inner boom 48 and the positioning of the wheel engaging assemblies 54 for restraining the front wheels of a vehicle, indicated in phantom lines in that figure.

It is to be understood that the FIGS. 25A-H are diagramatic in nature for indicating various operational positioning of parts during the boom lowering and wheel engaging activities, but are not fully representative of the actual sequence of activities which occur during the wheel engaging practice. More specifically, in normal practice the inner boom 48 is usually extended and the chock assemblies 154 positioned on the cross tree immediately adjacent the front wheels of the disabled vehicle. Thereafter the wheel engaging members 156-158 are spaced as neceesary to fit the wheel of the vehicle to be towed and swung about the pivot assemblies 155 (see FIGS. 25D and E) until they reach wheel engaging positions (indicated in FIG. 25G) where the restraint bars 158 are located behind the wheels (see FIG. 25H). The tubular members 156 and 157 are then securely locked in the position by the latch means 184.

Once the wheels of the disabled vehicle are secured between the restraint bars 158 and the chock assemblies 154 as indicated in FIG. 25H, the lift boom is raised slightly and tie down straps, (not shown herein) are secured to the pad eyes 201 and 200 for holding the wheels to the wheel restraint assemblies the up/down control lever 204 is then moved to raise the vehicle (particularly the front end in the illustrated case of FIG. 25H). During upward movement of the front end of the vehicle, for example, the retracting activity of the outer lift boom in and along the inclined cam track means, as previously described, advances the towed vehicle slightly up and over the tailgate section of the towing vehicle. At the same time the lift boom assembly tilts upwardly as it reaches its fully raised position as illustrated in FIG. 12A of the drawings.

From the foregoing it is believed that those familiar with the art will recognize and appreciate the novel advancement presented by the present invention and will understand that while the same is herein described in association with a preferred embodiment illustrated in the accompanying drawings, the same is susceptible to wide variation and substitution of equivalents without departing from the scope of the invention which is intended to be unlimited by the foregoing except as may appear in the following appended claims.

I claim:

1. For use with a tow truck having a horizontal planar bed, a wheel lift mechanism for engaging, lifting and lowering a vehicle to be towed, comprising: a pair of laterally spaced, parallel and registeringly aligned, elongated, rectilinear track means having laterally opposed open tracks mounted in concealed position beneath the truck bed; said track means being vertically inclined to extend angularly downwardly and rearwardly with the upper ends thereof over the rear axle of the truck and the lower ends thereof terminating above ground level beneath the tailgate portion of the truck; stationary, laterally opposed, elongated cam means carried by and extending lengthwise entirely within each of said open tracks, rigid lift boom means located centrally between said track means and having wheel engaging means attached thereto, plural cam follower means extending outwardly of opposite lateral sides of said boom means for operatively engaging said cam means and supporting said boom means for movement parallel to and between said track means; said cam means being configured and arranged to effect a series of sequential vertical tilting movements of said lift boom means as said follower means move over said cam means and advance along the incline of said track means; and power actuated means coupled to said boom means and mounted remotely of said track means in concealed position beneath the truck bed; said power actuated means being selectively operable to effect raising and lowering movements of said boom means along said track means.

2. The combination of claim 1, wherein said power actuated means comprises a lift cylinder assembly mounted horizontally beneath the truck bed and having linearly moveable piston means coupled to said boom means, and means for selectively operating said piston means to effect raising and lowering movements of said boom means along said track means.

3. The combination of claim 2, and articulateable means coupling said piston means to said lift boom means.

4. The combination of claim 3, wherein said articulateable means comprises at least one elongated, flexible member having one end thereof stationarily anchored and the other end thereof secured to said boom means for movement with the latter, and rotatable means carried at the outer end of said piston means for rotatably engaging said flexible member intermediate its ends.

5. The combination of claim 2, and safety latch means automatically operable upon pre-determined raising movement of said boom means along said track means, to positively interfere with lowering movement of said boom means past said latch means, and means operable upon actuation of said means for operating said piston means to initiate lowering movement of said boom means, to retract said latch means to a non-interferring position.

6. The combination of claim 1, characterized by plural elongated cam means carried by each said track means, and said plural follower means being spaced axially along the length of said boom means for engaging said cam means at spaced locations whereby to effect said vertical tilting movements of said boom means as it moves along said track means.

7. The combination of claim 6, wherein said follower means comprises at least two pairs of coaxially rotatable roller members mounted to extend from opposite lateral sides of said boom means, said pairs of roller members being located adjacent the upper and lower ends of said boom means; and wherein said track means have lower open ends, whereby in the fully lowered position of said boom means, the lowermost pair of said roller members is disposed beyond the lower ends of and disengaged from said track means to effect pivotal movement of said boom means limited by engagement of the uppermost pair of said roller members with said track means thereby adapting the lower end of said boom means, upon ground engagement, to conform to upward and downward variations in ground slope.

8. The combination of claim 1, and guide means for maintaining said lift boom means aligned substantially centrally between said track members.

9. The combination of claim 1, wherein said lift boom means comprises an outer boom having a pedestal portion supported by said follower means for movement along said track means, and a tubular portion extending angularly outwardly from the lower end of said pedestal portion and rearwardly of the tailgate portion of the tow truck.

10. The combination of claim 9, and an inner boom mounted coaxially within said tubular portion, and additional power actuated means connected to and between said inner boom and said tubular portion and operable to axially reciprocate said inner boom coaxially of said tubular portion.

11. The combination of claim 10, and elongated rigid cross tree means pivotally mounted to and carried transversely across the outer end of said inner boom for movement therewith, said wheel engaging means attached to the outer ends of said cross tree means for capturing the front or rear wheels of a disabled vehicle.

12. The combination of claim 11, wherein said wheel engaging means comprises a pair of wheel engageable chocks mounted coaxially over the outer ends of said cross tree means for limited sliding movement therealong, and a pair of rigid L-shaped wheel restraint assemblies, each having one arm pivotally connected at its outer end to one of said wheel chocks for horiztontal arcuate movement about the outer end of the latter; each of said restraint assemblies being manually moveable between a storage position in which said one arm thereof lies adjacently parallel to and alongside said cross tree means and the other arm thereof lies adjacently parallel to and alongside said tubular portion and an operating position in which said one arm extends at right angles across an adjacent outer end of an associated said wheel chock and said other arm thereof lies in spaced parallelism with the latter.

13. The combination of claim 12, wherein said one arm of each of said wheel restraint assemblies comprises a pair of coaxially moveable members, and means for selectively interlocking said members at various positions of relative axial movement.

14. The combination of claim 12, and means limiting sliding movement of said wheel chocks, and means for locking said wheel chocks at selected positions on said cross tree means.

15. The combination of claim 12, and means for locking said wheel restraint assemblies at the extremes of their arcuate movement.

16. The combination of claim 1, wherein each said track means supports a pair of vertically spaced, elongated cam members each having planar intersecting cam surfaces, and said follower means comprise plural rotatable roller means mounted at spaced positions on opposite sides of said lift boom means for sequentially engaging said surfaces as said boom means is raised and lowered along the slope of said track means.

* * * * *